United States Patent
Uehara et al.

(10) Patent No.: US 9,256,074 B2
(45) Date of Patent: Feb. 9, 2016

(54) LIQUID CRYSTAL OPTICAL ELEMENT AND STEREOSCOPIC IMAGE DISPLAY DEVICE

(75) Inventors: Shinichi Uehara, Tokyo (JP); Masako Kashiwagi, Kanagawa-ken (JP); Ayako Takagi, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 29 days.

(21) Appl. No.: 13/616,601

(22) Filed: Sep. 14, 2012

(65) Prior Publication Data
US 2013/0222717 A1 Aug. 29, 2013

(30) Foreign Application Priority Data
Feb. 29, 2012 (JP) .................................. 2012-043650

(51) Int. Cl.
G02F 1/139 (2006.01)
G02B 27/22 (2006.01)
H04N 13/04 (2006.01)
G02F 1/1339 (2006.01)
G02F 1/1343 (2006.01)
G02F 1/29 (2006.01)

(52) U.S. Cl.
CPC ............ *G02B 27/22* (2013.01); *G02F 1/13394* (2013.01); *G02F 1/134309* (2013.01); *G02F 1/29* (2013.01); *H04N 13/042* (2013.01); *H04N 2213/001* (2013.01)

(58) Field of Classification Search
None
See application file for complete search history.

(56) References Cited

U.S. PATENT DOCUMENTS

| | | | |
|---|---|---|---|
| 5,648,828 A | 7/1997 | Sakamoto et al. | |
| 6,441,880 B1 * | 8/2002 | Utsumi et al. | 349/155 |
| 7,697,109 B2 * | 4/2010 | Yun et al. | 349/200 |
| 8,675,148 B2 * | 3/2014 | Takagi et al. | 349/15 |
| 8,823,917 B2 * | 9/2014 | Lee et al. | 349/200 |
| 2009/0283769 A1 | 11/2009 | Park et al. | |

(Continued)

FOREIGN PATENT DOCUMENTS

| | | |
|---|---|---|
| CN | 101976005 A1 | 2/2011 |
| EP | 0 695 966 A2 | 2/1996 |

(Continued)

OTHER PUBLICATIONS

Notification of Reason(s) for Refusal issued by the Japanese Patent Office on Apr. 15, 2014, for Japanese Patent Application No. 2012-043650, and English-language translation thereof.

(Continued)

*Primary Examiner* — Richard Kim
(74) *Attorney, Agent, or Firm* — Finnegan, Henderson, Farabow, Garrett & Dunner, L.L.P.

(57) ABSTRACT

According to one embodiment, a liquid crystal optical element includes first and second substrate units, a liquid crystal layer, and spacers. The first substrate unit includes a first substrate and first electrodes. The first substrate has a first major surface. The first electrodes are provided on the first major surface, extend along a first direction, and have a first width in a second direction perpendicular to the first direction. The second substrate unit includes a second substrate and an opposing electrode. The second substrate has a second major surface opposed to the first major surface. The opposing electrode is provided on the second major surface. The liquid crystal layer is provided between the first and second substrate units. The spacers are in contact with the liquid crystal layer. A diameter of each spacer is larger than the first width.

16 Claims, 4 Drawing Sheets

(56) References Cited

U.S. PATENT DOCUMENTS

| | | |
|---|---|---|
| 2010/0238276 A1 | 9/2010 | Takagi et al. |
| 2011/0157499 A1 | 6/2011 | Lee et al. |
| 2011/0181827 A1* | 7/2011 | Takahashi et al. ............ 349/200 |
| 2011/0310320 A1* | 12/2011 | Takahashi et al. .............. 349/33 |
| 2012/0019733 A1* | 1/2012 | Kim et al. ....................... 349/15 |
| 2012/0057087 A1* | 3/2012 | Takagi et al. ................... 349/15 |
| 2012/0069255 A1 | 3/2012 | Takagi et al. |

FOREIGN PATENT DOCUMENTS

| | | |
|---|---|---|
| JP | 10-3082 | 1/1998 |
| JP | 11-142860 | 5/1999 |
| JP | 2006-084881 | 3/2006 |
| JP | 2010-224191 | 10/2010 |
| WO | WO 2011/036736 A1 | 3/2011 |

OTHER PUBLICATIONS

Notification of the First Office Action of Chinese Application No. 201210352010.2, dated Mar. 30, 2015 (7 pages).

Notification of the Second Office Action issued by the State Intellectual Property Office of the People's Republic of China on Sep. 25, 2015, for Chinese Patent Application No. 201210352010.2, and English-language translation thereof.

* cited by examiner

FIG. 3A  FIG. 3B  FIG. 3C  FIG. 3D
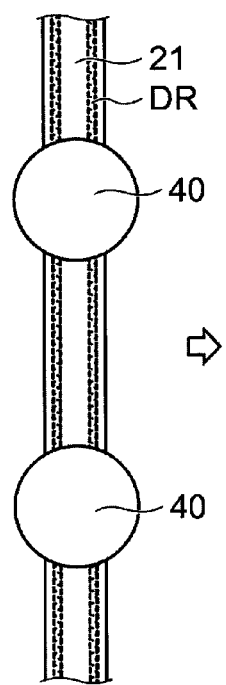
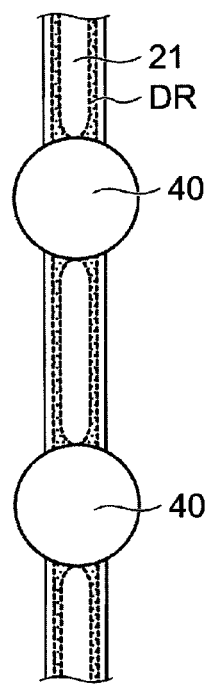
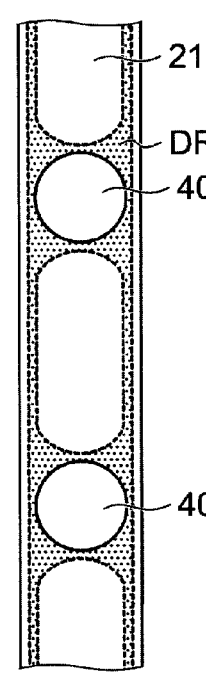
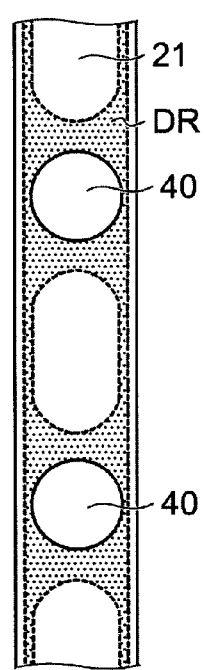
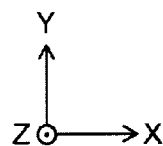

LIQUID CRYSTAL OPTICAL ELEMENT AND STEREOSCOPIC IMAGE DISPLAY DEVICE

CROSS-REFERENCE TO RELATED APPLICATIONS

This application is based upon and claims the benefit of priority from the prior Japanese Patent Application No. 2012-043650, filed on Feb. 29, 2012; the entire contents of which are incorporated herein by reference.

FIELD

Embodiments described herein relate generally to a liquid crystal optical element and a stereoscopic image display device.

BACKGROUND

There is known a liquid crystal optical element which uses the birefringence of liquid crystal molecules to change the refractive index distribution in response to voltage application. There is also a stereoscopic image display device including such a liquid crystal optical element in combination with an image display unit.

The stereoscopic image display device is switched between two states by changing the refractive index distribution of the liquid crystal optical element. In one state, the image displayed in the image display unit is directly projected on the observer's eye. In the other state, the image displayed in the image display unit is projected as a plurality of parallax images on the observer's eye. This realizes the operation of displaying a high-definition two-dimensional image and the operation of displaying a three-dimensional image for naked-eye stereoscopic viewing by means of a plurality of parallax images. In the liquid crystal optical element used in the stereoscopic image display device, it is desired to realize good optical characteristics.

BRIEF DESCRIPTION OF THE DRAWINGS

FIG. 3A to FIG. 3D are schematic views illustrating characteristics of the stereoscopic image display device according the first embodiment.

DETAILED DESCRIPTION

Figure 1A:
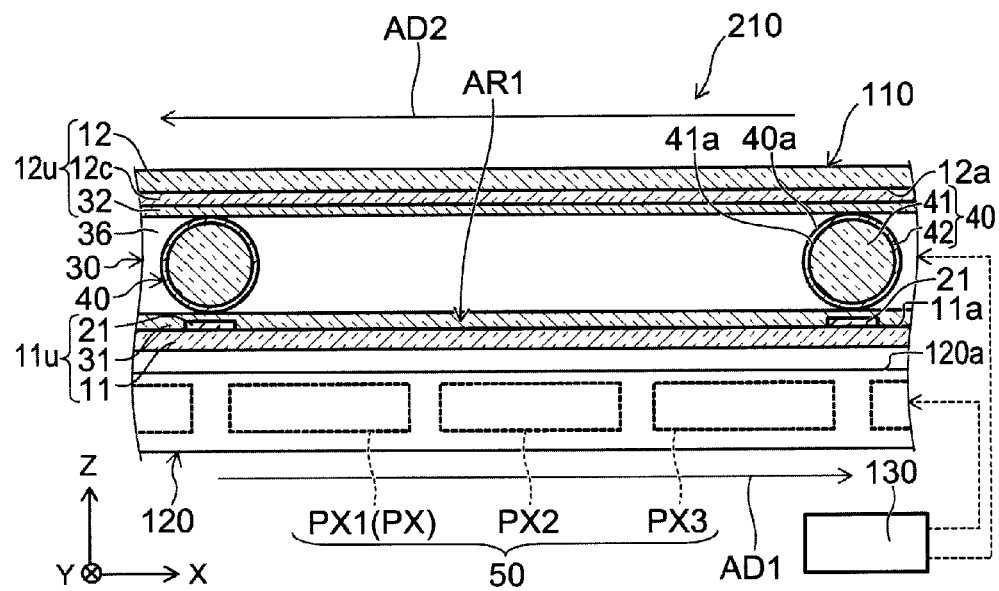
FIG. 1A and FIG. 1B are schematic views illustrating the configuration of a stereoscopic image display device according to a first embodiment.

According to one embodiment, a liquid crystal optical element includes a first substrate unit, a second substrate unit, a liquid crystal layer, and a plurality of spacers. The first substrate unit includes a first substrate and a plurality of first electrodes. The first substrate has a first major surface. The plurality of first electrodes are provided on the first major surface, extend along a first direction, and are arranged in a direction non-parallel to the first direction. The first electrodes have a first width in a second direction parallel to the first major surface and perpendicular to the first direction. The second substrate unit includes a second substrate and an opposing electrode. The second substrate has a second major surface opposed to the first major surface. The opposing electrode is provided on the second major surface and opposed to the first electrodes. The liquid crystal layer is provided between the first substrate unit and the second substrate unit. The plurality of spacers are in contact with the liquid crystal layer between the first substrate unit and the second substrate unit, and define a distance between the first substrate unit and the second substrate unit. A diameter of each spacer is larger than the first width.

According to one embodiment, a stereoscopic image display device includes a liquid crystal optical element and an image display unit. The liquid crystal optical element includes a first substrate unit, a second substrate unit, a liquid crystal layer, and a plurality of spacers. The first substrate unit includes a first substrate, and a plurality of first electrodes. The first substrate has a first major surface. The plurality of first electrodes are provided on the first major surface, extend along a first direction, and are arranged in a direction non-parallel to the first direction. The first electrode has a first width in a second direction parallel to the first major surface and perpendicular to the first direction. The second substrate unit includes a second substrate and an opposing electrode. The second substrate has a second major surface opposed to the first major surface. The opposing electrode is provided on the second major surface and opposed to the first electrodes. The liquid crystal layer is provided between the first substrate unit and the second substrate unit. The plurality of spacers are in contact with the liquid crystal layer between the first substrate unit and the second substrate unit, and define a distance between the first substrate unit and the second substrate unit. A diameter of each spacer is larger than the first width. The image display unit includes a display surface stacked with the liquid crystal optical element and is configured to display an image.

Various embodiments will be described hereinafter with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

First Embodiment

Figure 1B:
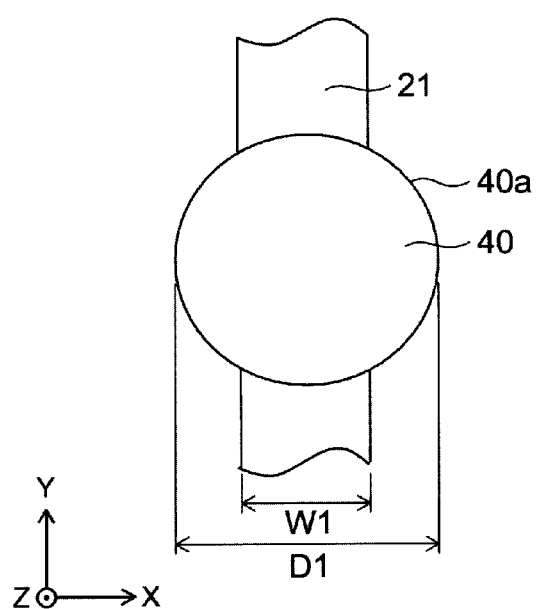

FIG. 1A and FIG. 1B are schematic views illustrating the configuration of a stereoscopic image display device according to a first embodiment.

FIG. 1A is a schematic sectional view illustrating the configuration of the stereoscopic image display device 210. FIG. 1B is a schematic plan view illustrating the configuration of part of the stereoscopic image display device 210.

As shown in FIG. 1A, the stereoscopic image display device 210 includes a liquid crystal optical element 110, an image display unit 120, and a drive unit 130.

The image display unit 120 includes a display surface 120a for displaying an image. The display surface 120a is e.g. rectangular.

The liquid crystal optical element 110 is displaced on the display surface 120a. For instance, the liquid crystal optical element 110 covers the display surface 120a. The liquid crystal optical element 110 functions as e.g. a liquid crystal GRIN lens (gradient index lens). The refractive index distribution of the liquid crystal optical element 110 is variable. One state of the refractive index distribution corresponds to a first state in which the image displayed on the display surface 120a is incident on the eyes of the human viewer. Another state of the refractive index distribution corresponds to a second state in which the image displayed on the image display unit 120 is incident on the eyes of the human viewer as a plurality of parallax images.

By changing the refractive index distribution of the liquid crystal optical element 110, the stereoscopic image display device 210 can be selectively switched between a two-dimensional image display (hereinafter referred to as 2D display) and a three-dimensional image display enabling naked-eye stereoscopic viewing (hereinafter referred to as 3D display).

The drive unit 130 is electrically connected to the liquid crystal optical element 110. In this example, the drive unit 130 is further electrically connected to the image display unit 120. The drive unit 130 controls the operation of the liquid crystal optical element 110 and the image display unit 120. For instance, the drive unit 130 switches between the first state and the second state of the liquid crystal optical element 110. The drive unit 130 receives input of an image signal through e.g. a recording medium or an external input. Based on the inputted image signal, the drive unit 130 controls the operation of the image display unit 120. Thus, an image corresponding to the inputted picture signal is displayed on the display surface 120a. The drive unit 130 may be included in the image display unit 120. Alternatively, the drive unit 130 may be included in e.g. the liquid crystal optical element 110. For instance, only the part of the drive unit 130 related to driving the liquid crystal optical element 110 may be included in the liquid crystal optical element 110.

In the case of performing 2D display, the drive unit 130 turns the liquid crystal optical element 110 to the first state and causes the image display unit 120 to display an image for 2D display. In the case of performing 3D display, the drive unit 130 turns the liquid crystal optical element 110 to the second state and causes the image display unit 120 to display an image for 3D display.

The liquid crystal optical element 110 includes a first substrate unit 11u, a second substrate unit 12u, a liquid crystal layer 30, and a plurality of spacers 40. The first substrate unit 11u includes a first substrate 11 and a first electrode 21. The second substrate unit 12u includes a second substrate 12 and an opposing electrode 12c.

The first substrate 11 has a first major surface 11a. The second substrate 12 has a second major surface 12a opposed to the first major surface 11a. The first major surface 11a is substantially parallel to the second major surface 12a. The first electrodes 21 are provided in a plurality on the first major surface 11a. The plurality of first electrodes 21 each extend along a first direction and are disposed with spacing in a second direction perpendicular to the first direction. The spacing between the plurality of first electrodes 21 is e.g. constant.

A direction perpendicular to the first major surface 11a and the second major surface 12a is taken as a Z-axis direction. One of the directions perpendicular to the Z-axis direction is taken as an X-axis direction. The direction perpendicular to the Z-axis direction and the X-axis direction is taken as a Y-axis direction. In this example, the Y-axis direction is taken as the first direction. The X-axis direction is taken as the second direction. However, in the embodiment, the first direction may be an arbitrary direction perpendicular to the Z-axis direction. The first direction may be an arbitrary direction along the first major surface 11a.

In this example, one of the two mutually perpendicular sides of the rectangular display surface 120a is parallel to the X-axis direction, and one other side is parallel to the Y-axis direction. The direction of the sides of the display surface 120a is not limited thereto, but may be an arbitrary direction perpendicular to the Z-axis direction.

The second substrate unit 12u is opposed to the first substrate unit 11u. The second major surface 12a of the second substrate 12 is opposed to the first major surface 11a. The opposing electrode 12c is provided on the second major surface 12a. The opposing electrode 12c is opposed to each of the plurality of first electrodes 21. The opposing electrode 12c is larger than the first electrode 21, and covers the first electrodes 21 as viewed in the Z-axis direction.

The plurality of first electrodes 21 and the opposing electrode 12c are electrically connected to the drive unit 130 via interconnects, not shown. Voltage application (potential setting) to the plurality of first electrodes 21 and the opposing electrode 12c is controlled by the drive unit 130. The switching between the first state and the second state of the liquid crystal optical element 110 is performed by voltage application to the plurality of first electrodes 21 and the opposing electrode 12c.

The liquid crystal layer 30 is provided between the first substrate unit 11u and the second substrate unit 12u. The liquid crystal layer 30 includes a liquid crystal material 36 including a plurality of liquid crystal molecules 35. The liquid crystal material 36 is a liquid crystalline medium. The liquid crystal layer 30 is made of e.g. a nematic liquid crystal. The dielectric anisotropy of the liquid crystal layer 30 is positive or negative. In the following, it is assumed that the liquid crystal layer 30 is made of a nematic liquid crystal having positive dielectric anisotropy.

The first substrate unit 11u further includes a first alignment film 31. The first alignment film 31 is provided between the first substrate 11 and the liquid crystal layer 30. The first alignment film 31 also is provided between the plurality of first electrodes 21 and the liquid crystal layer 30. That is, the first alignment film 31 is provided on the first substrate 11 so as to cover the first major surface 11a and the plurality of first electrodes 21. The first alignment film 31 has been subjected to an alignment processing directed from one side of the X-axis direction toward the other side of the X-axis direction. The direction AD1 of the alignment processing of the first alignment film 31 is e.g. the direction from left to right in the state shown (+X direction).

The second substrate unit 12u further includes a second alignment film 32. The second alignment film 32 is provided between the second substrate 12 and the liquid crystal layer 30. The second alignment film 32 is provided between the opposing electrode 12c and the liquid crystal layer 30. The second alignment film 32 is provided on the second major surface 12a of the second substrate 12 so as to cover the opposing electrode 12c. The second alignment film 32 has been subjected to alignment processing directed from the one other side of the X-axis direction toward the one side of the X-axis direction. The direction AD2 of the alignment processing of the second alignment film 32 is e.g. the direction from right to left in the state shown (−X direction). That is, the direction AD1 of the alignment processing of the first alignment film 31 and the direction AD2 of the alignment processing of the second alignment film 32 are non-parallel.

Due to the above alignment processing, the first alignment film 31 and the second alignment film 32 horizontally align the liquid crystal molecules 35. Here, the liquid crystal molecules 35 have a prescribed pre-tilt angle associated with the direction of the alignment processing. The first alignment film 31 and the second alignment film 32 direct the director (long axis) of the liquid crystal molecules 35 to the X-axis direction. Thus, the liquid crystal material 36 exhibits e.g. a horizontal alignment (that is, parallel alignment) in the state in which a voltage is not applied between the plurality of first electrodes 21 and the opposing electrode 12c (the state shown in FIG. 1A and FIG. 1B).

Here, the horizontal alignment includes e.g. the state in which the long axis of the liquid crystal molecule 35 is in a range of 0° or more and 30° or less, with the direction perpendicular to the Z-axis direction defined as 0°. That is, the pre-tilt angle in the horizontal alignment is e.g. 0° or more and 30° or less. Here, the liquid crystal layer 30 may be in vertical alignment or hybrid alignment (HAN alignment).

The first substrate 11, the second substrate 12, the first electrode 21, and the opposing electrode 12c are made of e.g. a transparent material. The light including the image displayed on the image display unit 120 is transmitted through the first substrate 11, the second substrate 12, the first electrode 21, and the second electrode 22.

The first substrate 11 and the second substrate 12 are made of e.g. glass or a resin. The first electrode 21 and the opposing electrode 12c include e.g. an oxide including at least one element selected from the group consisting of In, Sn, Zn, and Ti. The first electrode 21 and the opposing electrode 12c are made of e.g. ITO. The first electrode 21 and the opposing electrode 12c may be made of e.g. at least one of $In_2O_3$ and $SnO_3$. The first electrode 21 and the opposing electrode 12c may be e.g. a thin metal layer.

The first alignment film 31 and the second alignment film 32 are made of e.g. a resin such as polyimide. The film thickness of the first alignment film 31 and the second alignment film 32 is e.g. 200 nm (e.g., 100 nm or more and 300 nm or less).

The plurality of spacers 40 are provided between the first substrate unit 11u and the second substrate unit 12u. The plurality of spacers 40 are in contact with the liquid crystal layer 30 between the first substrate unit 11u and the second substrate unit 12u and defines a distance between the first substrate unit 11u and the second substrate unit 12u. The plurality of spacers 40 are e.g. granular. The plurality of spacers 40 are shaped like e.g. a ball or spheroid. The shape of the plurality of spacers 40 is arbitrary.

The spacer 40 includes a core 41 and a surface layer 42 provided on the surface of the core 41. The core 41 is made of e.g. an acrylic or styrene-based resin material, or an inorganic material such as silica. The surface layer 42 includes e.g. at least one of a straight alkyl group having a carbon number of 3 or more, and a straight alkoxy group having a carbon number of 3 or more. The surface layer 42 includes e.g. a long-chain alkyl silane. The surface layer 42 may include e.g. a fluorine-containing functional group. The spacer 40 is e.g. light transmissive. The spacer 40 is e.g. transparent.

The surface energy of the surface 40a (surface layer 42) of the spacer 40 is smaller than e.g. the surface energy of the surface 41a of the core 41. The surface energy of the surface 40a of the spacer 40 is smaller than e.g. the surface energy of the liquid crystal material 36. The liquid crystal molecules 35 included in the liquid crystal layer 30 vertically align on the surface 40a of the spacer 40. That is, the spacer 40 is an aligning spacer.

Each of the plurality of spacers 40 is provided at least between the plurality of first electrodes 21 and the opposing electrode 12c. The plurality of spacers 40 may be provided between the opposing electrode 12c and the portion of the first major surface 11a not provided with the first electrode 21. The plurality of spacers 40 are dispersed between the first substrate unit 11u and the second substrate unit 12u by e.g. a dry or wet dispersion process. The plurality of spacers 40 may be provided at a desired position (e.g., on the first electrode 21) between the first substrate unit 11u and the second substrate unit 12u using e.g. a dispenser.

As shown in FIG. 1B, a diameter D1 of each of the plurality of spacers 40 is larger than a width W1 (first width) in the X-axis direction of each of the plurality of first electrodes 21. For instance, in the case where the spacer 40 is shaped like a ball, the diameter D1 is the diameter of the spacer 40. For instance, in the case where the spacer 40 is shaped like a spheroid, the diameter D1 is the short diameter of the spacer 40. The average diameter of the plurality of spacers 40 is defined as a diameter D1. The width W1 of the first electrode 21 is e.g. narrower than a width of the narrowest portion of the spacer 40. The width W1 of the first electrode 21 is e.g. 20 μm (e.g., 10 μm or more and 30 μm or less). The diameter D1 of the spacer 40 is e.g. 30 μm (e.g., 20 μm or more and 40 μm or less). That is, the distance between the first substrate unit 11u and the second substrate unit 12u is e.g. 30 μm.

The image display unit 120 includes a plurality of pixel groups 50 arranged in a two-dimensional matrix configuration. The display surface 120a is formed from the plurality of pixel groups 50. The length in the Y-axis direction of the first electrode 21 is slightly longer than the length in the Y-axis direction of the display surface 120a. Thus, the first electrode 21 traverses the display surface 120a in the Y-axis direction. The pixel group 50 includes e.g. a first pixel PX1, a second pixel PX2, and a third pixel PX3. In the following, the first pixels PX1 to the third pixels PX3 are also collectively referred to as pixels PX. The pixel group 50 is disposed opposite to a region AR1 between the two nearest first electrodes 21. The first pixels PX1 to the third pixels PX3 included in the pixel group 50 are arranged in the X-axis direction. The number of the plurality of pixels PX included in the pixel group 50 is not limited to three, but may be two, or four or more.

For instance, the image display unit 120 emits the light including the image to be displayed on the display surface 120a. This light is in a linearly polarized state, traveling substantially in the Z-axis direction. The polarization axis (the orientation axis in the X-Y plane of the vibration plane of the electric field) of this linearly polarized light is in the X-axis direction. That is, the polarization axis of this linearly polarized light is directed parallel to the director (long axis) of the liquid crystal molecule. This linearly polarized light is formed by e.g. disposing an optical filter (polarizer) having a polarization axis in the X-axis direction on the optical path.

In the case where the voltage is not applied between the plurality of first electrodes 21 and the opposing electrode 12c, each of a plurality of liquid crystal molecules included in the liquid crystal layer 30 is horizontally aligned. Thus, in the X-axis direction and the Y-axis direction, a nearly uniform refractive index distribution is exhibited. Hence, in the case where the voltage is not applied, the traveling direction of the light including the image displayed in the image display unit 120 is left substantially unchanged. In the case where the voltage is not applied, the liquid crystal optical element 110 is switched to the first state.

In the case of switching the liquid crystal optical element 110 from the first state to the second state, the drive unit 130 applies a voltage between e.g. the plurality of first electrodes 21 and the opposing electrode 12c. For instance, the drive unit 130 makes the absolute value (effective value (for example, root-mean-square value)) of the voltage of the plurality of first electrodes 21 relatively higher than the absolute value (effective value) of the voltage of the opposing electrode 12c.

For instance, the drive unit 130 grounds the opposing electrode 12c. Thus, the drive unit 130 applies to the first electrode 21a voltage different from that of the opposing electrode 12c.

Figure 2A:
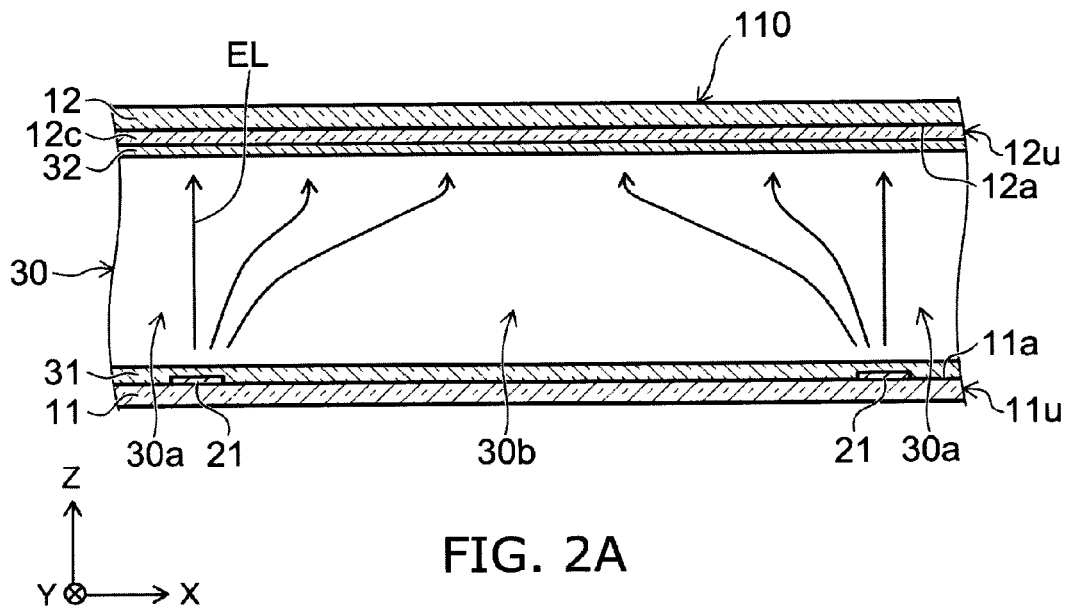
FIG. 2A and FIG. 2B are schematic sectional views illustrating a part of the configuration of the stereoscopic image display device according the first embodiment.
Figure 2B:
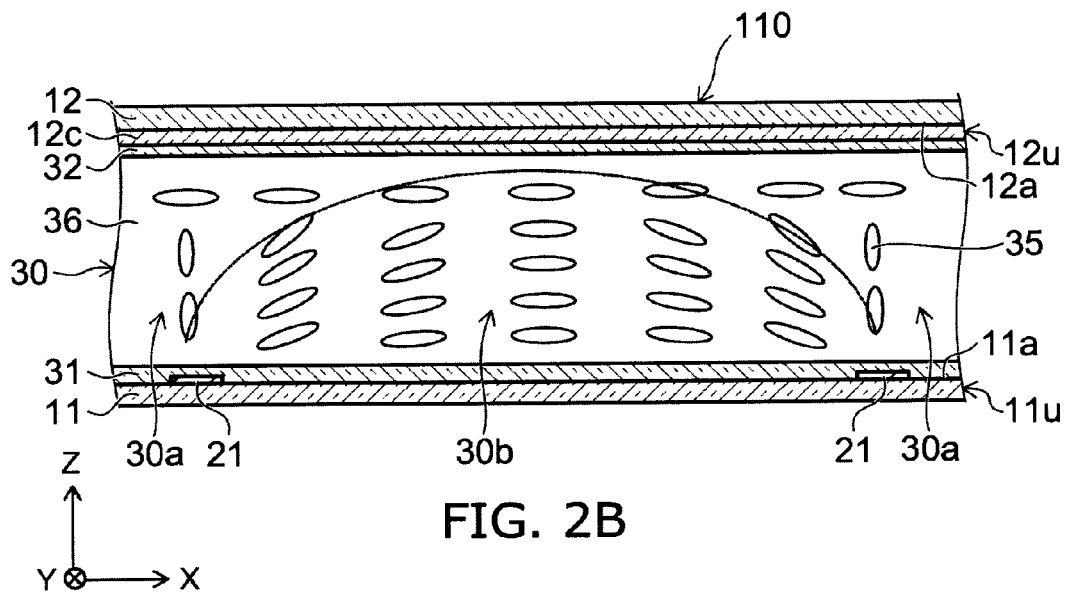

FIG. 2A and FIG. 2B are schematic sectional views illustrating the configuration of part of the stereoscopic image display device according to the first embodiment.

As shown in FIG. 2A, voltage is applied to the plurality of first electrodes 21 and the opposing electrode 12c as described above. Then, lines of electric force EL are produced from the first electrode 21 toward the opposing electrode 12c. The lines of electric force EL have e.g. a horizontally symmetric distribution with respect to the first electrode 21.

FIG. 2B illustratively models the alignment of the liquid crystal molecules 35 in the liquid crystal layer 30. As shown in FIG. 2B, in the case where the dielectric anisotropy of the liquid crystal layer 30 is positive, the alignment of the liquid crystal molecules 35 in the dense region of the lines of electric force EL (i.e., high electric field region) is deformed along the line of electric force EL. In a first portion 30a of the liquid crystal layer 30 where the first electrode 21 is opposed to the opposing electrode 12c, the tilt angle of the liquid crystal molecule 35 is increased. On the other hand, in a second portion 30b of the liquid crystal layer 30 around the midpoint of two adjacent first electrodes 21, the liquid crystal molecule 35 remains to be horizontally aligned. In the portion between the first portion 30a and the second portion 30b, the angle (tilt angle) of the liquid crystal molecule 35 changes so as to gradually come close to vertical alignment from the second portion 30b toward the first portion 30a. The liquid crystal molecules 35 change the angle of the long axis of the liquid crystal molecule 35 in the Z-X plane along the line of electric force EL. The angle of the long axis of the liquid crystal molecule 35 changes with the Y axis serving as the axis of rotation.

The liquid crystal molecule 35 is birefringent. The refractive index for polarized light in the long-axis direction of the liquid crystal molecule 35 is higher than the refractive index in the short-axis direction of the liquid crystal molecule 35. If the angle of the liquid crystal molecules 35 is changed as described above, the refractive index of the liquid crystal layer 30 for linearly polarized light traveling in the Z-axis direction with the polarization axis directed in the X-axis direction is high in the second portion 30b of the liquid crystal layer 30 and gradually decreases toward the first portion 30a. This forms a refractive index distribution like a convex lens.

The plurality of first electrodes 21 extend along the Y-axis direction. Thus, the refractive index distribution of the liquid crystal layer 30 under voltage application is shaped like a cylindrical lens extending along the Y-axis direction. Furthermore, the plurality of first electrodes 21 are arranged along the X-axis direction. Thus, in the liquid crystal layer 30 viewed as a whole, the refractive index distribution of the liquid crystal layer 30 under voltage application is shaped like a lenticular lens in which a plurality of cylindrical lenses extending along the Y-axis direction are arranged in the X-axis direction.

The pixel group 50 of the image display unit 120 is placed opposite to the region AR1 between two adjacent first electrodes 21. The refractive index distribution like a convex lens formed in the liquid crystal layer 30 is opposed to the pixel group 50. In this example, the high refractive index portion (second portion 30b) of the refractive index distribution of the liquid crystal layer 30 is opposed to the second pixel PX2 placed at the center of the pixel group 50.

The refractive index distribution of the liquid crystal layer 30 under voltage application causes the light (image) emitted from the pixel groups 50 to travel toward the eyes of the human viewer. Thus, the image formed by a plurality of first pixels PX1 included in the display surface 120a constitutes a first parallax image. The image formed by a plurality of second pixels PX2 constitutes a second parallax image. The image formed by a plurality of third pixels PX3 constitutes a third parallax image. The parallax image for the right eye is selectively incident on the right eye of the human viewer. The parallax image for the left eye is selectively incident on the left eye of the human viewer. This enables 3D display. That is, in the case where a voltage is applied between the plurality of first electrodes 21 and the opposing electrode 12c, the liquid crystal optical element 110 is switched to the second state.

In the case where the liquid crystal optical element 110 is in the first state, the light emitted from the pixel group 50 travels straight and is incident on the eye of the human viewer. This enables 2D display. The 2D display can display a normal 2D image at a higher resolution than 3D display by a factor of the number of parallaxes (in this example, three times).

The plurality of pixels PX can each be provided with a color filter including RGB three primary colors. This enables color display. Besides RGB three primary colors, the color filter may further include white (colorless) and other color elements.

Thus, the liquid crystal optical element 110 of the stereoscopic image display device 210 is switched between 2D display and 3D display by changing the refractive index distribution of the liquid crystal layer 30 depending on whether voltage is applied to the plurality of first electrodes 21 and the opposing electrode 12c.

When the liquid crystal optical element 110 is switched from the first state to the second state, on the first electrode 21, the direction of the director of the liquid crystal changes from horizontal alignment so as to come close to vertical alignment. At this time, at least one of reverse tilt (reversal of the tilt direction of the liquid crystal) and twist (rotation in the X-Y plane of the director of the liquid crystal) occurs and causes disclination. This degrades the optical characteristics of the liquid crystal optical element 110.

FIGS. 3A to 3D are schematic views illustrating the characteristics of the stereoscopic image display device according to the first embodiment.

FIGS. 3A to 3D schematically show the disclination region DR occurring in the portion of the first electrode 21 in the second state.

FIG. 3A schematically shows the region DR immediately after switching to the second state in the configuration of the first electrode 21 and the spacer 40 according to the first embodiment.

FIG. 3B schematically shows the region DR after the passage of a prescribed time from switching to the second state in the configuration of the first electrode 21 and the spacer 40 according to the first embodiment.

FIG. 3C schematically shows the region DR immediately after switching to the second state in the configuration of a reference example in which the width along the X-axis direction of the first electrode 21 is wider than the diameter of the spacer 40.

FIG. 3D schematically shows the region DR after the passage of a prescribed time from switching to the second state in the above reference example.

As shown in FIG. 3A to FIG. 3D, disclination occurs on e.g. the first electrode 21. FIG. 3A to FIG. 3D show this disclination observed under a cross-nicol sandwiched between two orthogonal polarizing plates. Under a cross-nicol, the region DR of the lateral portion in the X-axis direction of the disclination is observed as light leakage. Disclination occurs along the first electrode 21. This disclination is formed at the boundary between different alignment states on the balance therebetween. Thus, the disclination is in an unstable state. By a certain trigger, the disclination changes along the strip-shaped first electrode 21 over time. Thus, the disclination easily changes to a more complex alignment state. Hence, after the passage of time from switching to the second state, for instance, a plurality of disclinations arranged in the Y-axis direction change to a more complex alignment state and are connected to each other. The influence of this changed disclination is greater than before the change. For instance, the width in the X-axis direction of the disclination spreads. Furthermore, its complex alignment increases the effect of scattering incident light. This significantly impairs the performance as a lens.

In the case where the width of the first electrode 21 is wider than the diameter of the spacer 40, this change of disclination to the Y-axis direction originates from the spacer 40. However, as shown in FIG. 3A and FIG. 3B, in the case where the width of the first electrode 21 is narrower than the diameter of the spacer 40, the change of disclination to the Y-axis direction does not originate from the spacer 40. Furthermore, even in the case where disclination occurs due to any cause between two adjacent spacers 40, the disclination does not spread beyond the spacers 40.

As shown in FIG. 3C and FIG. 3D, in the case where the width of the first electrode 21 is wider than the diameter of the spacer 40, the region of disclination is larger than the diameter of the spacer 40. Hence, the change of disclination originates from the region between the spacer 40 and the disclination in the X-axis direction. Furthermore, the spread of disclination to the Y-axis direction surpasses the spacer 40. Thus, even in the case where no disclination occurs between two adjacent spacers 40, the disclination spreads beyond the spacers 40.

In the case where the width of the first electrode 21 is wider than the diameter of the spacer 40, the region of disclination spreads over time around the spacer 40. For instance, the disclination propagates along the Y-axis direction from the spacer 40. This is a new technical problem found by the present inventors.

In the stereoscopic image display device 210, the occurrence of disclination causes visual confusion (crosstalk) of parallax images and impairs the stereoscopic viewing of the human viewer. In particular, change of disclination complicates the alignment state and increases the scattering of incident light, causing more significant impairments. Furthermore, the stereoscopic image display device 210 based on the light-transmissive first electrode 21 exhibits the influence of disclination more significantly than e.g. liquid crystal display devices based on metal electrodes.

The present inventors have investigated the shape of the first electrode 21 and the spacer 40. Thus, the present inventors have found that the spread of disclination over time is suppressed in the configuration in which the width in the X-axis direction of the first electrode 21 is made narrower than the diameter of the spacer 40. In the stereoscopic image display device 210, the spread of disclination beyond the spacer 40 is suppressed. Furthermore, in the stereoscopic image display device 210, the spread of disclination around the spacer 40 is also suppressed. Thus, the stereoscopic image display device 210 achieves good optical characteristics. For instance, viewability is improved in the stereoscopic image display device 210. Furthermore, in the stereoscopic image display device 210, the spacers 40 are provided with the aligning property. Thus, particularly in combination with the configuration in which the width of the first electrode is made smaller than the diameter of the spacer 40, the spread of the change of disclination around the spacer 40 can be suppressed more appropriately.

Second Embodiment

Figure 4A:
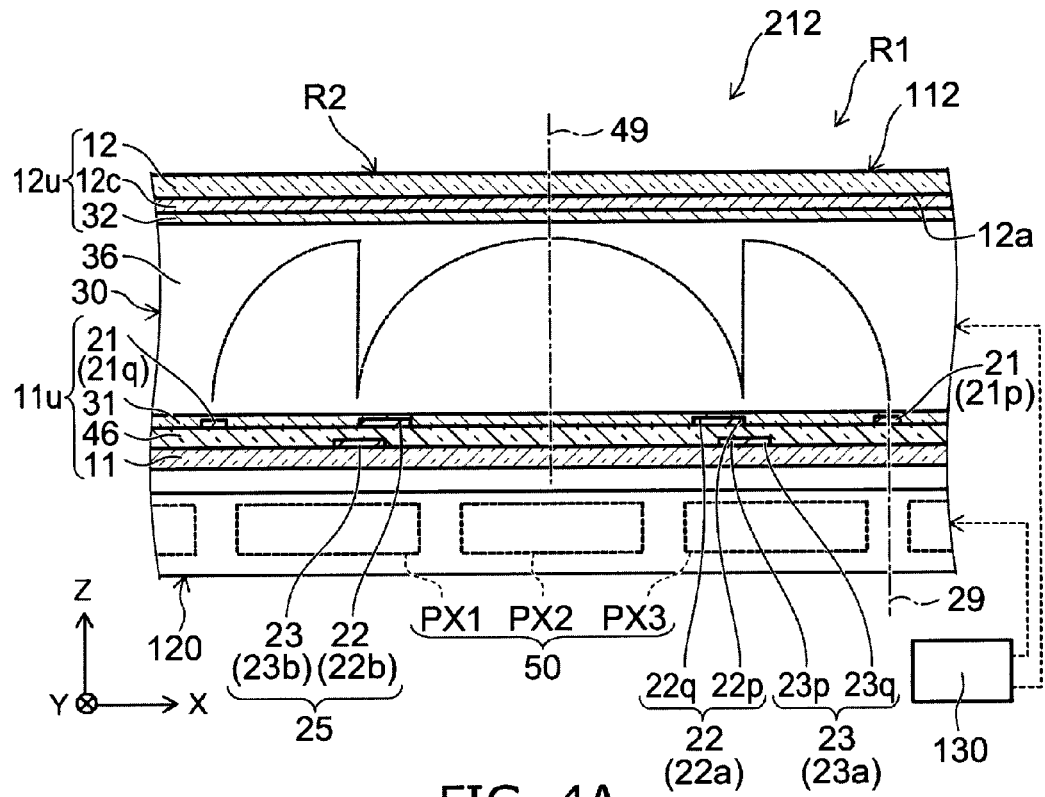
FIG. 4A and FIG. 4B are schematic views illustrating the configuration of a stereoscopic image display device according to a second embodiment
Figure 4B:
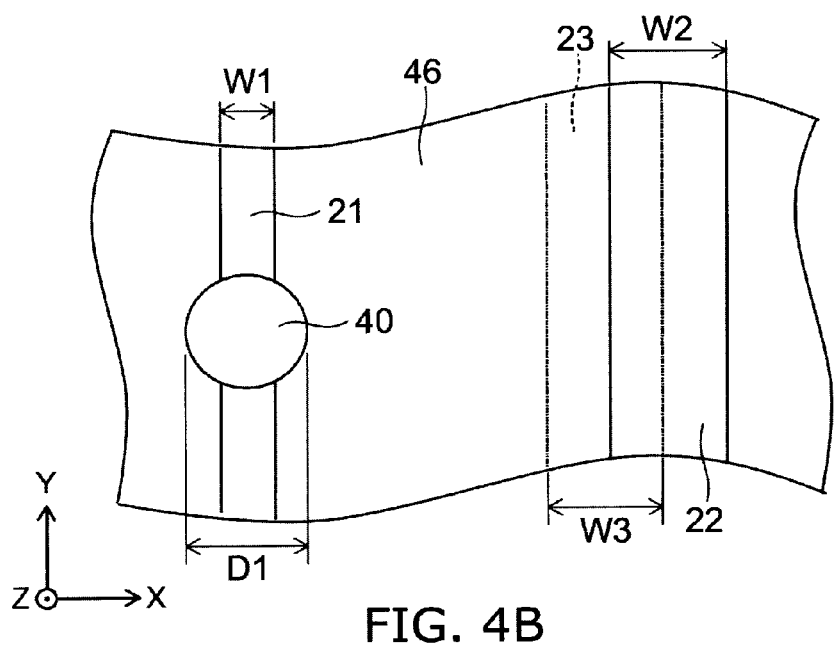

FIGS. 4A and 4B are schematic views illustrating the configuration of a stereoscopic image display device according to a second embodiment.

FIG. 4A is a schematic sectional view of the stereoscopic image display device 212. FIG. 4B is a schematic plan view illustrating the configuration of part of the stereoscopic image display device 212.

As shown in FIGS. 4A and 4B, in the stereoscopic image display device 212 of this example, the first substrate unit 11u of the liquid crystal optical element 112 further includes a plurality of electrode pairs 25. The plurality of electrode pairs 25 are each provided between adjacent ones of the plurality of first electrodes 21 on the first major surface 11a. The plurality of electrode pairs 25 are arranged in the second direction (X-axis direction). In FIG. 4A, for convenience, the spacers 40 are not shown.

Each of the plurality of electrode pairs 25 includes a second electrode 22 and a third electrode 23. The second electrode 22 extends in the Y-axis direction (first direction). The third electrode 23 extends in the Y-axis direction. In the liquid crystal optical element 112, an insulating layer 46 is provided between the second electrode 22 and the third electrode 23. The insulating layer 46 is provided also between the first substrate 11 and the first electrode 21. For instance, the insulating layer 46 is provided on the first substrate 11 so as to cover the third electrode 23 and the first major surface 11a. The insulating layer 46 is provided between the first substrate 11 and each of the plurality of second electrodes 22. A plurality of third electrodes 23 are provided between the first substrate 11 and the insulating layer 46. The plurality of first electrodes 21 and the plurality of second electrodes 22 are provided on the insulating layer 46. The insulating layer 46 may be continuous among the plurality of electrode pairs 25. In this example, the insulating layer 46 extends between the first electrode 21 and the first substrate 11.

In FIG. 4A, two of the plurality of first electrodes 21 are shown. The number of the plurality of first electrodes 21 is arbitrary.

Let us focus on two nearest first electrodes 21 of the plurality of first electrodes 21. A central axis 49 exists between the nearest first electrodes 21. The central axis 49 passes through the midpoint of the line segment interconnecting the centers in the X-axis direction of the two nearest first electrodes 21. The central axis 49 is parallel to the Y-axis direction.

Let us focus on one electrode 21p of the two nearest first electrodes 21. The position 29 of this electrode 21p is the center position in the X-axis direction of the first electrode 21.

On the first major surface 11a, the region between the central axis 49 and the one electrode 21p of the two nearest first electrodes 21 is designated as first region R1. On the first major surface 11a, the region between the central axis 49 and the other electrode 21q of the two nearest first electrodes 21 is designated as second region R2. The direction from the central axis 49 toward the electrode 21p is designated as +X direction. Then, the direction from the central axis 49 toward the electrode 21q corresponds to −X direction.

In this example, in the first region R1, one electrode pair 25 is provided. Also in the second region R2, one electrode pair 25 is provided. As projected on the X-Y plane, the plurality of electrode pairs 25 are spaced from each other. A region without electrodes is present between the electrode pairs 25. In the embodiment, another electrode may be further provided between the electrode pairs 25.

In one electrode pair 25, the second electrode 22 includes a first overlapping portion 22p overlapping the third electrode 23 as projected on the plane parallel to the first direction and the second direction (X-Y plane), and a first non-overlapping portion 22q not overlapping the third electrode 23. In the one electrode pair 25, the third electrode 23 includes a second overlapping portion 23p overlapping the second electrode 22 as projected on the X-Y plane, and a second non-overlapping portion 23q not overlapping the second electrode 22.

In the liquid crystal optical element 112, in the electrode pair 25 included in the first region R1, the first overlapping portion 22p is placed between the second overlapping portion 23p and the liquid crystal layer 30. The position of the second electrode 22 is shifted in the X-axis direction relative to the position of the third electrode 23. Specifically, in one electrode pair 25, the distance between the second non-overlapping portion 23q and the central axis 49 is longer than the distance between the first non-overlapping portion 22q and the central axis 49. That is, in one electrode pair 25, the second electrode 22 is nearer to the central axis 49 than the third electrode 23. That is, one second electrode 22a of the plurality of second electrodes 22 is placed in the first region R1. Another second electrode 22b of the plurality of second electrodes 22 is placed in the second region R2. One third electrode 23a of the plurality of third electrodes 23 is placed in the first region R1. Another third electrode 23b of the plurality of third electrodes 23 is placed in the second region R2. The distance from the central axis 49 of the second electrode 22a is nearer than the distance from the central axis 49 of the third electrode 23a. The distance from the central axis 49 of the second electrode 22b is nearer than the distance from the central axis 49 of the third electrode 23b.

The arrangement of the electrode pair 25 in the second region R2 is substantially line-symmetric with the central axis 49 serving as the axis of symmetry. However, it does not need to be exact line symmetry. For instance, slight asymmetry may be introduced based on the distribution of the arrangement (e.g., pre-tilt angle) in the liquid crystal layer 30.

In the case of switching the liquid crystal optical element 112 from the first state to the second state, for instance, the drive unit 130 applies a first voltage between the first electrode 21 and the opposing electrode 12c, applies a second voltage between the second electrode 22 and the opposing electrode 12c, and applies a third voltage between the third electrode 23 and the opposing electrode 12c. Here, for convenience, the case of zeroing the potential difference between the electrodes is also represented as applying a voltage (a voltage of 0 volts). The absolute value of the first voltage is larger than the absolute value of the second voltage. The absolute value of the first voltage is larger than the absolute value of the third voltage. The absolute value of the second voltage is larger than the absolute value of the third voltage. In the case where these voltages are alternating, the effective value of the first voltage is larger than the effective value of the second voltage. The effective value of the first voltage is larger than the effective value of the third voltage. The effective value of the second voltage is larger than the effective value of the third voltage. For instance, the effective value of the first voltage is set larger than the effective value of the third voltage.

If the voltages are applied as described above, then in the portion of the liquid crystal layer 30 where the first electrode 21 is opposed to the opposing electrode 12c, the liquid crystal molecule 35 that has been horizontally aligned is made close to vertically aligned. In the portion of the liquid crystal layer 30 around the midpoint of two adjacent first electrodes 21, the liquid crystal molecule 35 remains to be horizontally aligned. In the portion of the liquid crystal layer 30 where the opposing electrode 12c is opposed to the second electrode 22, the liquid crystal molecule 35 that has been horizontally aligned is made close to vertically aligned. In the portion of the liquid crystal layer 30 where the opposing electrode 12c is opposed to the second non-overlapping portion 23q of the third electrode 23, the liquid crystal molecule 35 remains to be horizontally aligned.

In the portion between the first electrode 21 and the third electrode 23, the refractive index gradually increases from the first electrode 21 toward the third electrode 23. Around the boundary between the second non-overlapping portion 23q and the first overlapping portion 22p, the refractive index sharply decreases from the third electrode 23 toward the second electrode 22. In the portion between the second electrode 22 and the central axis 49, the refractive index gradually increases from the second electrode 22 toward the central axis 49. Hence, if the voltages are applied as described above, the refractive index distribution like a Fresnel lens appears in the liquid crystal layer 30. The refractive index distribution has a step difference of refractive index in the portion where the opposing electrode 12c is opposed to the electrode pair 25.

In the liquid crystal optical element 112 forming a refractive index distribution like a Fresnel lens in the liquid crystal layer 30, the thickness of the liquid crystal layer 30 can be made thinner than in the liquid crystal optical element 110. The response rate of the liquid crystal layer 30 in switching between the first state and the second state can be increased.

As shown in FIG. 4B, the width W1 in the X-axis direction of each of the plurality of first electrodes 21 is narrower than the diameter D1 of each of the plurality of spacers 40. The width W1 in the X-axis direction of each of the plurality of first electrodes 21 is narrower than the width W2 (second width) in the X-axis direction of each of the plurality of second electrodes 22. The width W1 in the X-axis direction of each of the plurality of first electrodes 21 is narrower than the width W3 (third width) in the X-axis direction of each of the plurality of third electrodes 23. The width W2 of the second electrode 22 and the width W3 of the third electrode 23 may be narrower or wider than the diameter D1 of the spacer 40.

In the liquid crystal optical element 112, the width W1 of the first electrode 21 subjected to a large absolute value (large effective value) is narrower than the diameter D1 of the spacer 40. This suppresses the spread of disclination over time. In the liquid crystal optical element 112, the width W1 of the first electrode 21 is narrower than the width W2 of the second electrode 22 and the width W3 of the third electrode 23. Thus, at the lens edge of the refractive index distribution like a Fresnel lens formed in the liquid crystal layer 30, the change of the refractive index distribution around the lens edge can be made steep. Hence, the liquid crystal optical element 112 also achieves good optical characteristics.

The second electrode 22 may be part of the first electrode 21. That is, at least one of the first electrodes 21 includes a first overlapping portion overlapping the third electrode 23 as projected on the plane parallel to the first direction and the second direction, and a first non-overlapping portion not overlapping the third electrode 23. The third electrode 23 includes a second overlapping portion overlapping the first electrode 21 as projected on the plane, and a second non-overlapping portion not overlapping the first electrode 21.

According to the embodiments, a liquid crystal optical element and a stereoscopic image display device having good optical characteristics are provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

The embodiments of the invention have been described above with reference to examples. However, the embodiments of the invention are not limited to these examples. For instance, any specific configurations of various components such as the first substrate unit, second substrate unit, liquid crystal layer, spacer, first substrate, first electrode, second substrate, opposing electrode, core, surface layer, second electrode, and image display unit included in the liquid crystal optical element and the stereoscopic image display device are encompassed within the scope of the invention as long as those skilled in the art can similarly practice the invention and achieve similar effects by suitably selecting such configurations from conventionally known ones.

Further, any two or more components of the specific examples may be combined within the extent of technical feasibility and are included in the scope of the invention to the extent that the purport of the invention is included.

In addition, those skilled in the art can suitably modify and implement the liquid crystal optical element and the stereoscopic image display device described above in the embodiments of the invention. All the liquid crystal optical elements and the stereoscopic image display devices thus modified are also encompassed within the scope of the invention as long as they fall within the spirit of the invention.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A liquid crystal optical element comprising:
    a first substrate unit including:
        a first substrate having a first major surface;
        a plurality of first electrodes provided on the first major surface, extending along a first direction, and arranged in a direction non-parallel to the first direction, the first electrodes having a first width in a second direction parallel to the first major surface and perpendicular to the first direction;
        a plurality of second electrodes extending in the first direction on the first major surface, each second electrode being disposed between the first electrodes;
        an insulating layer provided between the first substrate and the second electrodes; and
        a plurality of third electrodes extending in the first direction and provided between the first substrate and the insulating layer;
    a second substrate unit including:
        a second substrate having a second major surface opposed to the first major surface; and
        an opposing electrode provided on the second major surface and opposed to the first electrodes;
    a liquid crystal layer provided between the first substrate unit and the second substrate unit, the liquid crystal layer having a refractive index distribution when voltages are applied between the first electrodes and the opposing electrode, between the second electrodes and the opposing electrode, and between the third electrodes and the opposing electrode, the refractive index distribution having a plurality of lens shape portions, each of the lens shape portions being provided between each of the first electrodes; and
    a plurality of spacers being in contact with the liquid crystal layer between the first substrate unit and the second substrate unit, and defining a distance between the first substrate unit and the second substrate unit, a diameter of each spacer being larger than the first width,
    one of the second electrodes-including:
        a first superimposed portion overlaying one of the third electrodes as projected on a plane parallel to the first direction and the second direction; and
        a first non-superimposed portion not overlaying the one of the third electrodes as projected on the plane,
    the one of the third electrodes-including:
        a second superimposed portion overlaying the one of the second electrodes as projected on the plane; and
        a second non-superimposed portion not overlaying the one of the second electrodes as projected on the plane.

2. The element according to claim 1, wherein liquid crystals included in the liquid crystal layer vertically align on a surface of the spacers.

3. The element according to claim 1, wherein the spacers include:
    a core; and
    a surface layer provided on a surface of the core and including at least one of a straight alkyl group having a carbon number of 3 or more and a straight alkoxy group having a carbon number of 3 or more.

4. The element according to claim 1, wherein the spacers include:
    a core; and
    a surface layer provided on a surface of the core and including a fluorine-containing functional group.

5. The element according to claim 1, wherein at least a part of the spacers is disposed between the first electrodes and the opposing electrode.

6. The element according to claim 1, wherein
    the third electrodes have a third width in the second direction, and
    the first width is narrower than the third width.

7. The element according to claim 1, wherein
    the one of the second electrodes is disposed in a first region between a central axis passing through a midpoint of a line segment interconnecting centers in the second direction of two nearest ones of the first electrodes and being vertical to the first direction and one of the two nearest first electrodes, and another of the second electrodes is disposed in a second region between the central axis and one other of the two nearest first electrodes,
    the one of the third electrodes is disposed in the first region, and another of the third electrodes is disposed in the second region, and
    a distance from the central axis to the one of the second electrodes is smaller than a distance from the central axis to the one of the third electrodes.

8. The element according to claim 1, wherein the first electrodes are provided on the insulating layer.

9. The element according to claim 1, wherein the first width of the first electrodes is 10 μm or more and 30 μm or less.

10. The element according to claim 1, wherein a diameter of the spacers is 20 μm or more and 40 μm or less.

11. The element according to claim 1, wherein the liquid crystal layer has horizontal alignment in a state in which a voltage is not applied between the first electrodes and the opposing electrode.

12. The element according to claim 1, wherein
an effective value of a first voltage applied between the first electrodes and the opposing electrode is larger than an effective value of a second voltage applied between the second electrodes and the opposing electrode, and
the effective value of the first voltage is larger than an effective value of a third voltage applied between the third electrodes and the opposing electrode.

13. A stereoscopic image display device comprising:
a liquid crystal optical element including:
  a first substrate unit including:
    a first substrate having a first major surface; and
    a plurality of first electrodes provided on the first major surface, extending along a first direction, and arranged in a direction non-parallel to the first direction, each of the first electrodes having a first width in a second direction parallel to the first major surface and perpendicular to the first direction;
  a second substrate unit including:
    a second substrate having a second major surface opposed to the first major surface; and
    an opposing electrode provided on the second major surface and opposed to the first electrodes;
  a liquid crystal layer provided between the first substrate unit and the second substrate unit, the liquid crystal layer having a refractive index distribution when a voltage is applied between the first electrodes and the opposing electrode, the refractive index distribution having a plurality of lens shape portions, each of the lens shape portions being provided between each of the first electrodes; and
  a plurality of spacers being in contact with the liquid crystal layer between the first substrate unit and the second substrate unit, and defining a distance between the first substrate unit and the second substrate unit, a diameter of each of the spacers being larger than the first width, each of the spacers overlapping a corresponding first electrode, and edges of each of the spacers extending outside of edges of the corresponding first electrode in the second direction;
an image display unit including a display surface stacked with the liquid crystal optical element and configured to display an image; and
a drive unit configured to apply a voltage to the first electrodes and the opposing electrode,
the first substrate unit further including a plurality of electrode pairs provided on the first major surface and arranged in the second direction,
at least one of the electrode pairs being disposed in each of spaces between the first electrodes,
the each of the electrode pairs including:
  a second electrode extending in the first direction;
  a third electrode extending in the first direction; and
  an insulating layer provided between the second electrode and the third electrode,
the second electrode including:
  a first superimposed portion overlaying the third electrode as projected on a plane parallel to the first direction and the second direction; and
  a first non-superimposed portion not overlaying the third electrode as projected on the plane,
the third electrode including:
  a second superimposed portion overlaying the second electrode as projected on the plane; and
  a second non-superimposed portion not overlaying the second electrode as projected on the plane,
the drive unit applying a first voltage between the first electrodes and the opposing electrode, applying a second voltage between the second electrode and the opposing electrode, and applying a third voltage between the third electrode and the opposing electrode,
an effective value of the first voltage being larger than an effective value of the second voltage,
the effective value of the first voltage being larger than an effective value of the third voltage, and
the effective value of the second voltage being larger than the effective value of the third voltage.

14. The device according to claim 13, wherein a length along the first direction of the first electrodes is longer than a length along the first direction of the display surface.

15. The device according to claim 13, wherein a light is emitted from the display surface, the light is incident on the liquid crystal optical element, and the light includes an image to be displayed and includes a linearly polarized light having a polarization axis in the second direction.

16. The device according to claim 13, further comprising:
a drive unit configured to apply a voltage to the first electrodes and the opposing electrode,
an alignment of liquid crystal of the liquid crystal layer between the first electrodes and the opposing electrode being changed by the voltage.

* * * * *